United States Patent

Weiss et al.

[11] Patent Number: 6,069,329
[45] Date of Patent: May 30, 2000

[54] LEVER SWITCH

[75] Inventors: Hans-Günter Weiss, Worms; Holger Besier, Oestrich-Winkel, both of Germany

[73] Assignee: Eaton Corporation, Cleveland, Ohio

[21] Appl. No.: 09/301,771

[22] Filed: Apr. 29, 1999

[30] Foreign Application Priority Data

May 18, 1998 [DE] Germany ............................ 198 22 271

[51] Int. Cl.[7] ...................................................... H01H 3/16
[52] U.S. Cl. ........................................ 200/61.3; 200/61.27
[58] Field of Search ............................. 200/61.28, 61.27, 200/61.54, 335, 5 R, 295

[56] References Cited

U.S. PATENT DOCUMENTS

| | | | |
|---|---|---|---|
| 4,277,658 | 7/1981 | Delp et al. ............................ | 200/61.54 |
| 5,049,706 | 9/1991 | Du Rocher ............................ | 200/61.54 |
| 5,120,914 | 6/1992 | Kerner et al. ......................... | 200/61.54 |
| 5,661,276 | 8/1997 | Shibata .................................. | 200/61.54 |
| 5,691,519 | 11/1997 | Mahr ..................................... | 200/61.54 |
| 5,828,021 | 10/1998 | Uchiyama et al. .................. | 200/61.54 |
| 5,834,720 | 11/1998 | Neubauer et al. ................... | 200/61.54 |

Primary Examiner—Michael L. Gellner
Assistant Examiner—Nhung Nguyen
Attorney, Agent, or Firm—Roger A. Johnston

[57] ABSTRACT

A lever switch, in particular a steering column switch for a motor vehicle, comprises a housing (1) with connector contacts (5), a switch lever (10) supported in the housing (1), a switch element (30 and 32, respectively) actuated by the switch lever (10) and acting on switch contact paths (24), and comprises a switch gate (14), which resets the switch lever (10) or locks it in position. In order to provide a lever switch offering variable switching functions while permitting an economical and cost-effective manufacture at the same time, a predetermined layout of switch contact paths (14) is used for the implementation of different lever switching functions in that the division of the switch contact paths (24) is different, that the association and/or values of the resistors (25) relative to the switch contact paths (24) is different, and that different, interchangeable switch gates (14) are used.

9 Claims, 5 Drawing Sheets

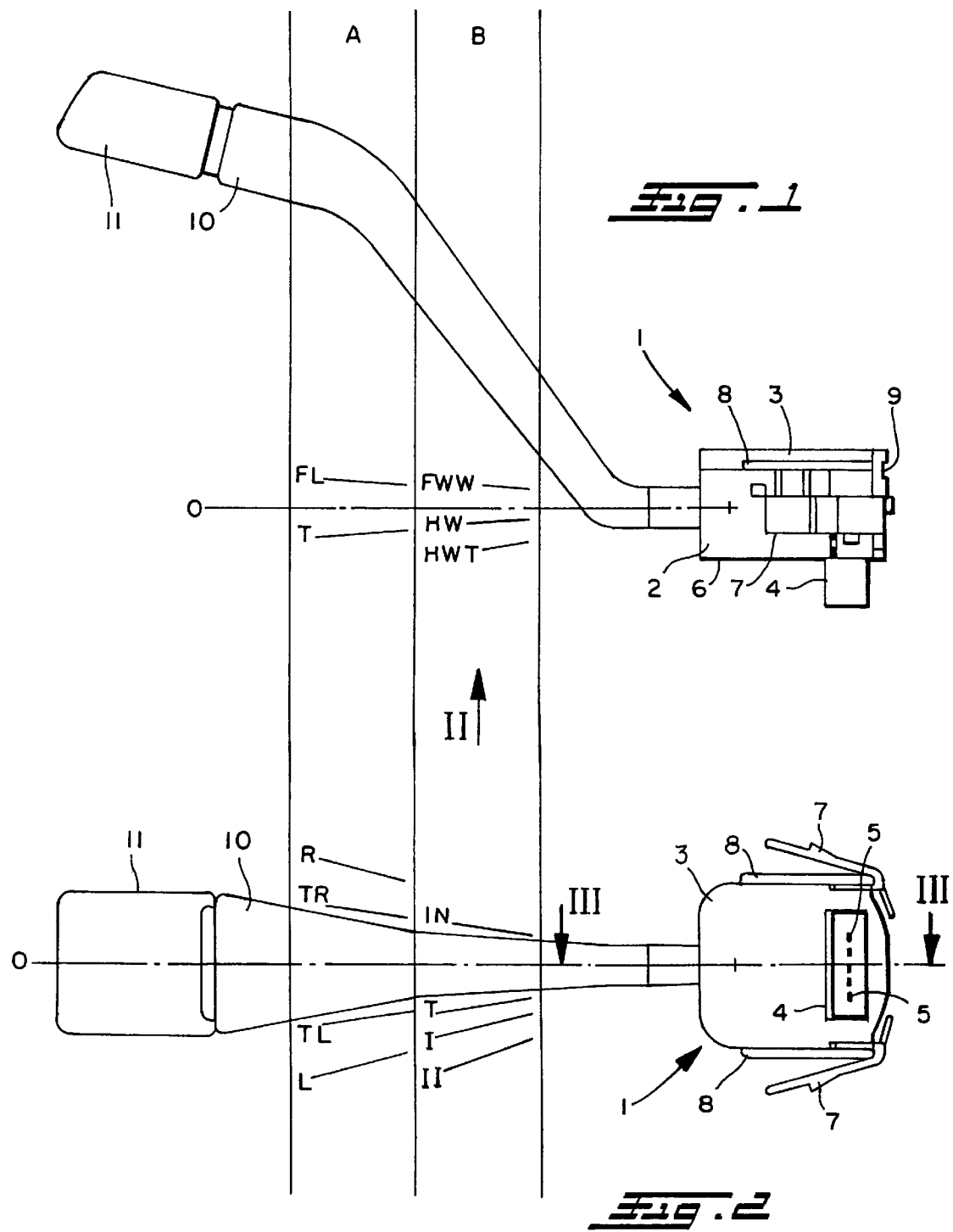

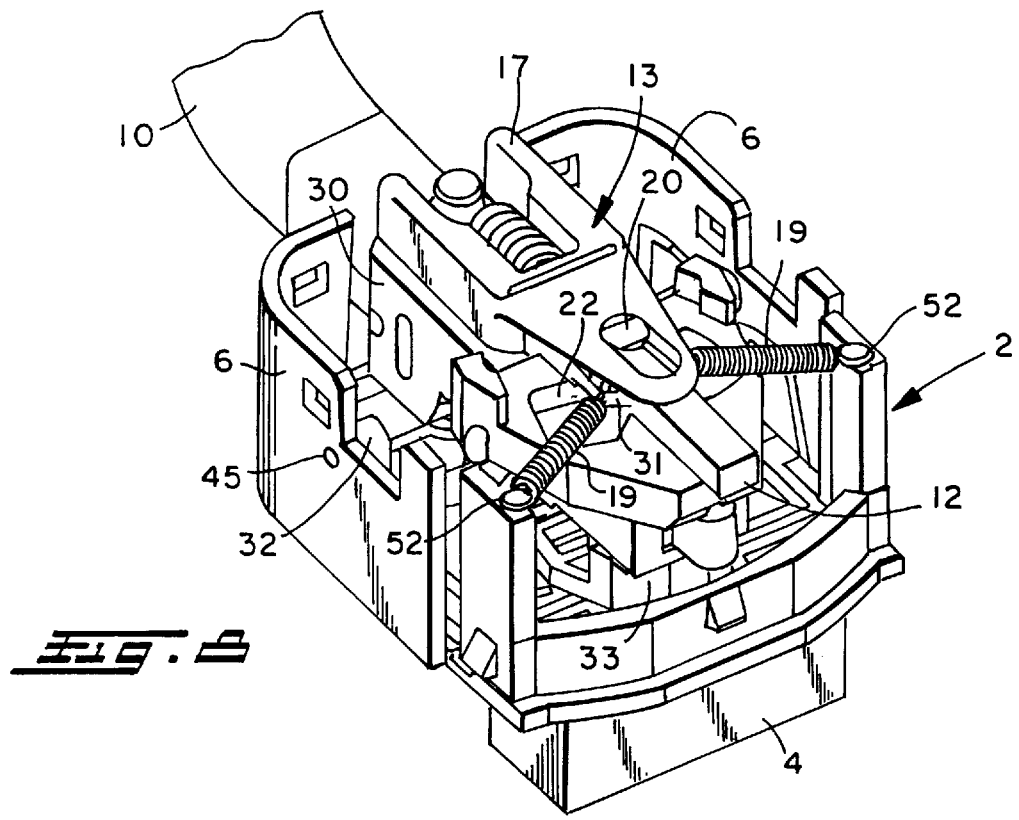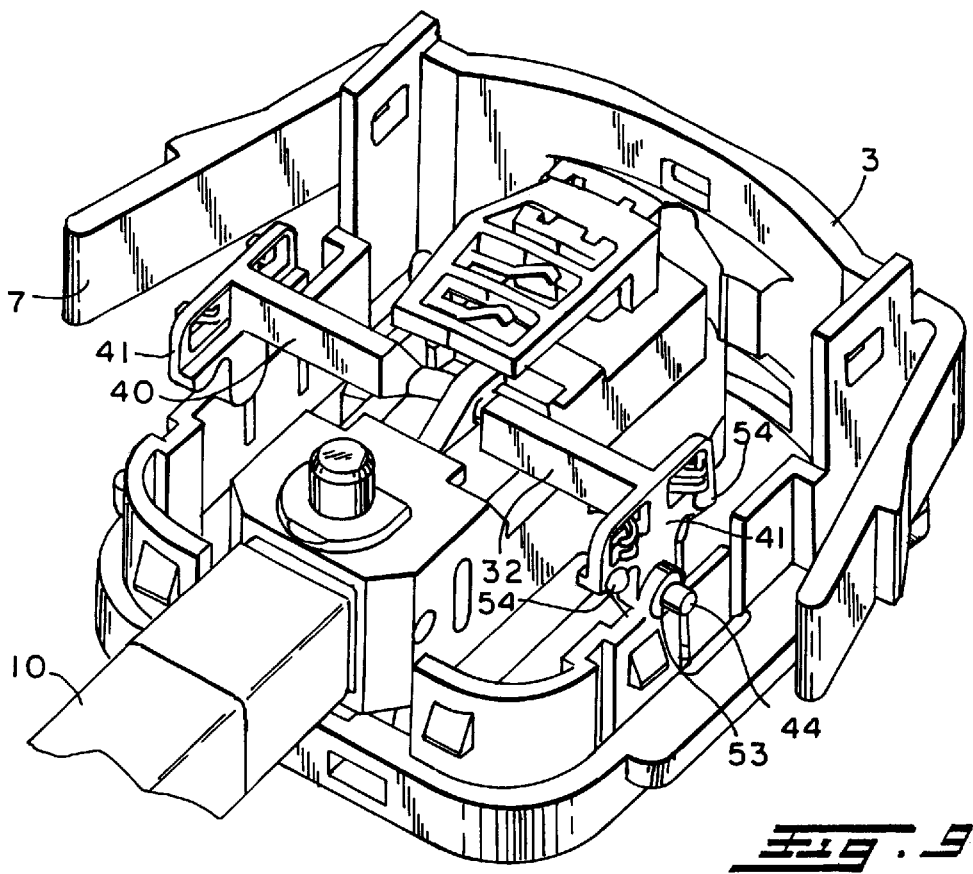

LEVER SWITCH

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to a lever switch, in particular a stalk switch for a motor vehicle steering column, comprising a housing with connector contacts, a switch lever supported in the housing, a switch element actuated by the switch lever and acting on switch contact paths, and comprising a switch gate, which resets the switch lever or locks it in position.

Literature reference DE AS 28 10 790 (U.S. Pat. No. 4,277,658) has disclosed two steering column switches configured as lever switches, which are mounted by means of a support housing to a steering column tube of a motor vehicle. In this reference, one lever switch is located on the right side of the steering column and one lever switch is located on its left side. In such an arrangement each lever switch is designed for specific functions, which are performed by means of pre-determined adjustment angles and engagement or resetting systems. In the reference device, the switch levers are also actuated in different directions with respect to each other. The housings of the lever switches have different heights, thereby necessitating the use of different tools for their manufacture. Furthermore, the internal arrangement of the lever switches is widely varied; therefore, many different individual components are required in order to provide desired switching functions, resulting in very high tooling and warehousing costs, thereby making the manufacture of lever switches significantly more expensive. Furthermore, in applications where the number of items to be manufactured is not relatively very high, the startup of a cost-effective automated manufacture is made difficult.

The problem to be solved by the present invention is to provide a lever switch of the described type, which ensures an economical and cost-effective manufacture and which offers a wide variation of functions.

BRIEF SUMMARY OF THE INVENTION

In accordance with the present invention this problem has been solved in that, a fixed layout of the switch contact paths is provided, and different switching functions of the lever switch can be implemented by different resistor association and or/values with respect to the switch contact paths and by different, interchangeable switch gates.

In particular the present invention uses only one basic switch contact path layout, and permits the cost-effective manufacture of the lever switch with a smaller number of different components at reduced tooling cost. A logic circuit connected downstream of the lever switch analyzes corresponding impedance values and their location and, therefore, ensures identification of the desired switch function. The lever switch can thus be used to switch different functions after exchanging or modifying individual components while maintaining components that are complex to manufacture.

In accordance with an advantageous further development of the present invention, the housing consists of an upper housing part and a lower housing part, which accommodate between them the switch gate and the switch element, whereby the switch element is associated with switch contact paths. Assembly is therefore very easy because individual components may be installed in the open housing in the appropriate position.

In order to allow the implementation of as many switch functions as possible and to achieve an exact control of the respective switch functions, one development of the invention provides a universal joint for the switch lever support in the housing use.

In order to create a space-saving and sturdy universal joint design, the first axis of rotation of the universal joint is located between the upper housing part and the lower housing part, including a rotary switch element, and the second axis of rotation of the universal joint is located inside the rotary switch element between the switch lever and said rotary switch element.

The extrusion-molding tools for the production of individual parts should not to be complex and not expensive; and, the contact springs should be associated easily with the contact paths, whereby changes of the circuit layout can be easily made. Therefore, in accordance with another development of the present invention, the rotary switch element consists of a centerpiece accommodating the switch lever and of a contact carrier retaining the corresponding contact springs, whereby the centerpiece and the contact carrier are connected with each other by means of guides. It is thus easy to fasten different contact springs to the contact carrier, thereby permitting the complete exchange of a loaded, automatically pre-fabricated contact carrier.

In accordance with another development of the present invention, the rotary switch element has a cutout, through which extends a switch lever claw; and, the inside of the rotary switch element has a pivot stop, which is aligned perpendicularly to the switch gate and associated with the end of the switch lever in the housing. This results in a compact design, inasmuch as the two switch elements can be positioned next to each other, which, in turn, permits a compact layout of the switch contact paths.

In another advantageous embodiment of the lever switch at least two switch elements are provided, whereby the rotary switch element is supported between the upper housing part and the lower housing part; and, a pivot switch element is supported in a rotatable manner perpendicular to the upper housing part. Therefore, the current path may be laid out easily inside the housing, whereby, in addition, different switch angles may be adapted easily to different switch directions.

The present invention enables the manufacture of individual internal switch parts with a minimum of material, while maintaining sufficient material strength and the safety of the electrical functions. The pivot switch element consists of two pivot disks which are located at a distance from each other and parallel with respect to the lateral walls, the disks being connected with each other by means of an actuation pin, whereby the pivot disks carry the contact springs associated with the switch contact paths and carry respectively one pivot pin, which is at an axial distance from the actuation pin, however, arranged coaxially with respect thereto. This material-saving actuation pin achieves a secure connection of the pivot disks, while the design remains compact. The axial distances from the actuation pin and the pivot pins permits the reliable switching of the contact paths.

The switch lever claw of the switch lever extends rotatably around the actuation pin of the pivot switch element and actuates the pivot switch element supported rotatably in the lateral walls of the lower housing part. Therefore, the actuation of the pivot switch element is ensured in a simple manner. The pivot switch element is supported by means of the pivot pins in the lateral walls of the lower housing part and by the engagement of the actuation pin with the switch lever claw, thereby defining the position of said pivot switch element in an unambiguous manner.

In order to switch a plurality of separate current paths, the rotary switch element preferably comprises at least one contact spring in alignment with the lower housing part; and, perpendicular thereto, is at least one contact spring of the pivot switch element, which faces one lateral wall of the lower housing part. In addition, the configuration of the contact spring may be varied, thereby creating an increased number of different current paths.

Furthermore, a large number of current paths is possible due to the large-area layout of the switch contact paths. A meandering layout of switch contact paths may also be employed, wherein the switch contact paths are provided inside the housing on the inside of the lower housing part facing the upper housing part; and, at least on one inside of a lateral wall of the lower housing part is located between the lower housing part and the interior wall of the housing.

In order to be able to produce stable switch contact paths with a sufficiently large cross-section to ensure current conduction, one advantageous embodiment provides that the switch contact paths be configured as a punch grid, which has contact sites for mounting resistors and connector contacts. In accordance with this arrangement, the electrical connection of the lever switch can be direct by means connector contacts.

In order to provide for universal installation, the lever switch must have empty spaces in which only individual parts for one specific use are installed. These empty spaces remain empty when the installed lever switch is a washer switch, for example. Therefore, the housing preferably has, in the area of its interior wall, integral accommodation chambers for components to be installed for a specific use and, also has, parallel to the switch gate, an integral slot for a resetting mechanism.

For small switch actuation angles the present invention still provides that the switch can be securely locked in position or returned. Also extreme forces acting on all the parts participating in the switch return are absorbed safely, and minimum of space is used. This is achieved by an index hole accommodating a rotary stop element provided in the rotary switch element, whereby the rotary stop element interacts with the switch gate; and, inside the switch lever in the switch lever end, a pivot stop element is inserted in a bore, whereby the pivot stop element interacts with the pivot stop located inside the rotary switch element.

A blinker switch with driving lights resetting function is implemented in the present invention with a built-in resetting mechanism, a corresponding switch gate and correspondingly installed resistors. The switch lever pivots parallel to the lower housing part, the rotary switch member is rotated and therefore the blinker lights are energized, whereby a touch-actuated position is taken before the blinker setting is engaged. The lever switch is moved out of the engaged blinker setting, either by the resetting mechanism interacting with the steering column or by hand. The desired light-reversal functions are performed by means of the pivot switch element, while all the elements interacting with the pivot stop are interacting.

If a wiper switch with washer functions is to be manufactured, it is preferably implemented by omitting the resetting mechanism and using an appropriate switch gate and by installing appropriate resistors. Inasmuch as all switching functions are actuated and reset manually, the resetting mechanism is not required. The front wiper functions are performed by means of the rotary switch element, which rotates parallel to the lower housing part. The rear wiper/washer functions are performed by means of the pivot switch element.

In accordance with one development of the present invention, the switch gate in the housing can be replaced by means of an interchangeable insert in one tool in order to minimize fitting work.

BRIEF DESCRIPTION OF THE DRAWINGS

FIG. 1 is a side elevation of a lever switch of the present invention;

FIG. 2 is a view from the bottom of the lever switch of FIG. 1 in the direction of arrow II;

FIG. 8 is a perspective view of the mounted lever switch without the upper housing part, however, with the resetting mechanism; and, FIG. 9 is a perspective view of the mounted lever switch without the lower housing part.

DETAILED DESCRIPTION OF THE INVENTION

Figure 3:
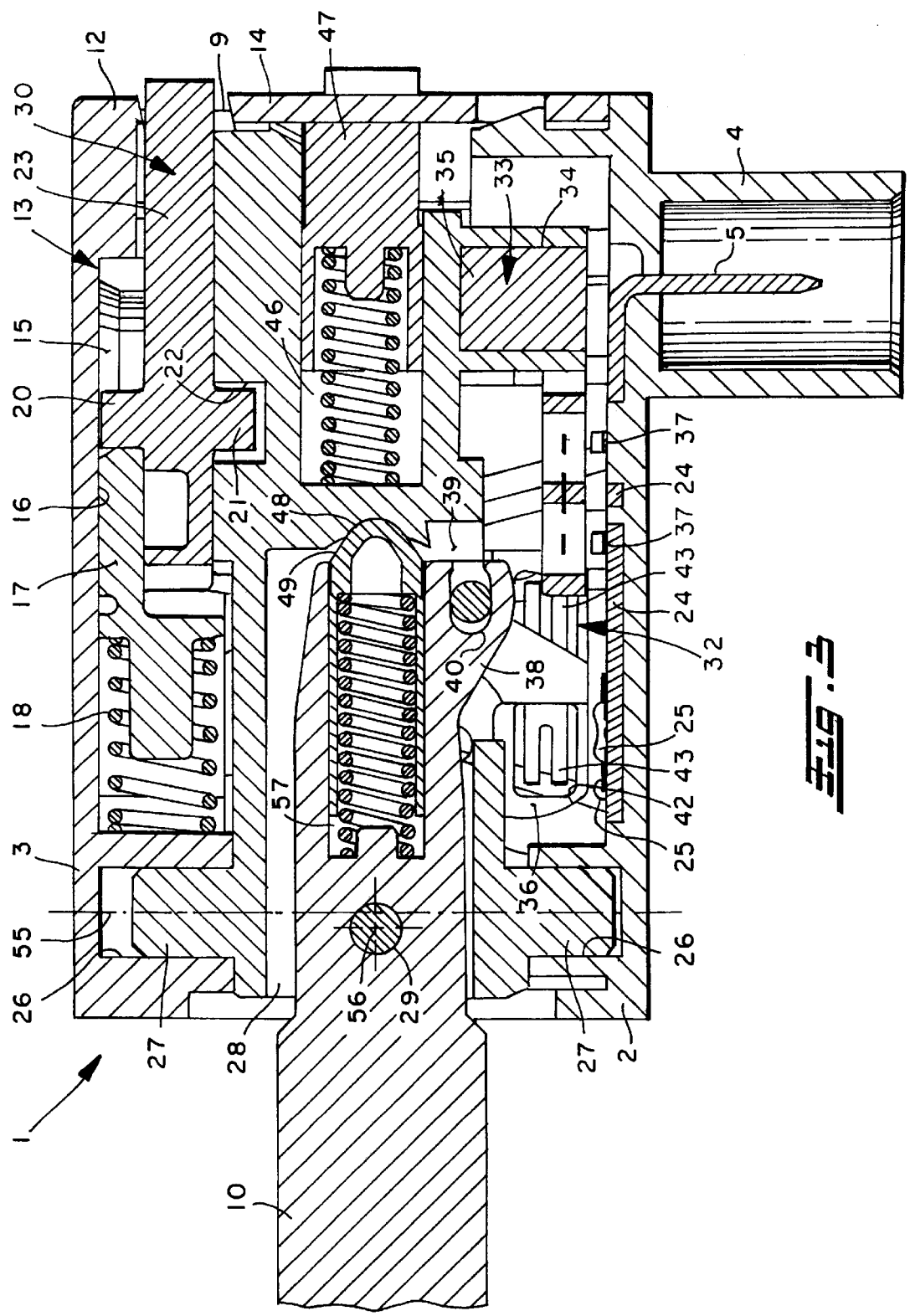
FIG. 3 is a longitudinal section of the lever switch of FIG. 2, along line III—III, on an enlarged scale.

FIG. 1 and FIG. 2 show a lever switch in its entirety, and which does not have a resetting mechanism, because there is no triggering element in slot 9. The lever switch comprises a housing indicated generally at 1, which consists essentially of a lower housing part 2 and an upper housing part 3. Molded to lower housing part 2 is a connector receptacle collar 4, which protects connector contacts 5 from being damaged. Furthermore, lower housing part 2 has lateral walls 6, which extend upward to upper housing part 3. A resilient locking arm 7 is provided on each side of upper housing part 3 in order to mount housing 1 in a not illustrated installation opening. Adjoining guide bars 8 molded to upper housing part 3 on both sides thereof are used to guide housing 1 in the installation opening. A switch lever or stalk 10 comprising on its free end a push button 11 extends out of housing 1 between lateral walls 6 and opposite slot 9.

FIG. 1 and FIG. 2 show vertical switch functions for two different lever switches. Column A shows the functions for a blinker lever switch with automatic resetting function, as well as for light-reversal functions. In accordance with FIG. 1 the blinker lever switch comprises an OFF-position "0," a touch position "T" for headlight flashing and an engaged position "FL" for high beams. FIG. 2 shows, in addition to the OFF-position "0," two actuation positions on each side. In upward direction, there is the position "TR" for touch-blinking to the right and the position "R" for engaged blinking to the right. Analogous thereto are the positions "TL" and "L" for blinking to the left. Column B shows the switch functions for a wiper/washer lever switch. As in FIG. 1, actuation position "FWW" for front window wiping/washing is reached in clockwise direction out of position "0" by touch; and, in counterclockwise direction, first the position "HW" for rear window washing by engagement and subsequently the actuation position "HWT" for rear window washing by touch. In accordance with FIG. 2 the switch sequence out of the "0" position in clockwise direction is the engaged actuation position "IN" for intermittent wiper operation. Following the "0" position in counterclockwise direction is the touched actuation position "T" for touch wiping and then follow the two engaged actuation positions "I" and "II" for wiper operation at different wiper speeds. All touch positions are reset automatically to "0" position.

The lever switch in accordance with FIG. 3 is a blinker lever switch provided with a resetting mechanism indicated generally at 13. The bisected right lateral wall represents part of a switch gate 14, which is manufactured by means of an interchangeable insert in the interchangeable tool and hence molded as integral part to housing 3. Above switch gate 14 is slot 9, through which extends a triggering element 12 of resetting mechanism 13 located in an accommodation chamber 15 on the inside of housing wall 16. In addition to triggering element 12, resetting mechanism 13 comprises a centering piece 17 with a return spring 18 and two tension springs 19 (see FIGS. 4 and 8). Triggering element 12 has two pins 20, 21, whereby upper pin 20 comes into engagement with a longitudinal hole 58 of centering piece 17 and lower pin 21 comes into engagement with a switch gate 22 of a centerpiece 23 of a rotary switch element indicated generally at 30. Centering piece 17 is pushed in the direction of switch gate 14 by means of return spring 18, which abuts against a stationary wall on the housing.

Recessed in the base of lower housing part 2 are two switch contact paths 24 configured as a punch grid, whereby, following spray-coating, the crosspieces between switch contact paths 24 are severed. This punch grid is bent in the vicinity of connector collar 4 and terminates as connector contact 5 in connector collar 4. On the inside, resistors 25 are welded to switch contact paths 24, thereby connecting the ends of said paths (see also FIG. 5 and FIG. 6).

An axle accommodation space 26 having the form of a hollow cylinder is provided in lower housing part 2 and in upper housing part 3, whereby the opening of said space faces the inside of housing 1. Axle accommodation space 26, which forms a first axis of rotation 55 of a universal joint, accommodates corresponding axles 27 molded to centerpiece 23. Centerpiece 23 of rotary switch element 30 pivots about these axles 27 parallel to switch contact paths 24, until it abuts with one of its exterior walls against one of the lateral walls 6 of lower housing part 2. This pivoting motion is the result of the action of switch lever 10, which is rotatably fixed in a centerpiece recess 28 by means of a pin 29.

Viewed in the direction of the drawing plane, only minimal play exists between centerpiece recess 26 and the extrusion-molded switch lever 10. Viewed in the other direction, however, there is sufficient free space for rotation about pin 29 in order to reach actuation positions "FL" and "T," for example. In addition, a second axis of rotation 56 is associated with switch lever 10, about which the lever can be moved with the use of a universal joint.

Rotary switch element 30, as well as a pivot switch element indicated generally at 32, are located between upper housing part 3 and lower housing part 2. Rotary switch element 30 interacts only with switch contact paths 24 in the base of lower housing part 2; whereas, pivot switch element 32 is in operative connection with switch contact paths 24 in lateral walls 6 of lower housing part 2. Rotary switch element 30 is composed of two extrusion-molded elements, i.e., a centerpiece 23 and a contact carrier indicated generally at 33. Molded to centerpiece 23 is a guide 34 (see FIG. 4) facing in the direction of the bottom of lower housing part 2, whereby an extension 35 of contact carrier 33 is plugged into the guide. A contact holder 36 having cutouts is affixed to extension 35 of contact carrier 33, whereby contact springs 37 are located in said cutouts and extruded into contact holder 36. Contact springs 37 project from the cutouts and are in operative connection with switch contact paths 24, depending on the actuation position of switch lever 10.

Pivot switch element 32 pivots about a pin 29, which represents the second axis of rotation 56 of the universal joint. Axes 55 and 56 of rotation are at a slight distance from each other (see FIG. 3). Pivot switch element 32 is actuated by means of switch lever 10, which carries a switch lever claw 38 on its free end associated with centerpiece 23. Switch lever claw 38 extends through a cutout 39 in centerpiece 23, where it receives an actuation pin 40 of pivot switch element 32 in a sliding motion. On each of its ends facing lateral walls 6 of lower housing part 2, actuation pin 40 carries a pivot disk 41, with cutouts 42 receiving contact springs 43.

The configuration of contact springs 37 and 43 depends on the number of switch contact paths 24 to be connected. Therefore, in the case of the blinker lever switch it is adequate when contact spring 43 has only one spring arm.

Actuation pin 40 connecting pivot disks 41 represents a dropped connecting rod with which the pivoting motion is initiated at a distance from pivot pins 44 into pivot disks 41. Pivot pins 44 are located on the sides of pivot disks 41 facing lateral walls 6 of lower housing part 2. Pivot disks 41 are aligned coaxially and therefore permit an easy pivoting of pivot switch element 32, in which case, depending on the actuation position of switch lever 10, contact springs 43 are in operative connection with switch contact paths 24 in lateral walls 6. When switch lever 10 is moved around pin 29, switch lever claw 38 also carries out a pivoting motion. Consequently, pivot switch element 32 also carries out a pivoting motion, i.e., about its pivot pins 44 supported in appropriate pin holes 45 in lateral walls 6 of lower housing part 2. Switch lever claw 38 is slightly constricted on its open side in order to prevent actuation pin 40 from sliding out.

An index hole 46 is provided in centerpiece 23 of rotary switch element 30 opposite switch gate 14. A spring-biased rotary stop element 47 is in engagement with index hole 46, and element 47, due to the spring action, abuts against switch gate 14 to lock the rotary switch element in actuation position or to reset it automatically.

In addition, a pivot stop 48 facing the end of switch lever 10 is an integral part of centerpiece 23. Positioned in pivot stop 48 is a spring-biased pivot stop element 49 guided in a bore 57 of switch lever 10; and, element 49 locks switch lever 10 in its actuation position or resets it.

Figure 4:
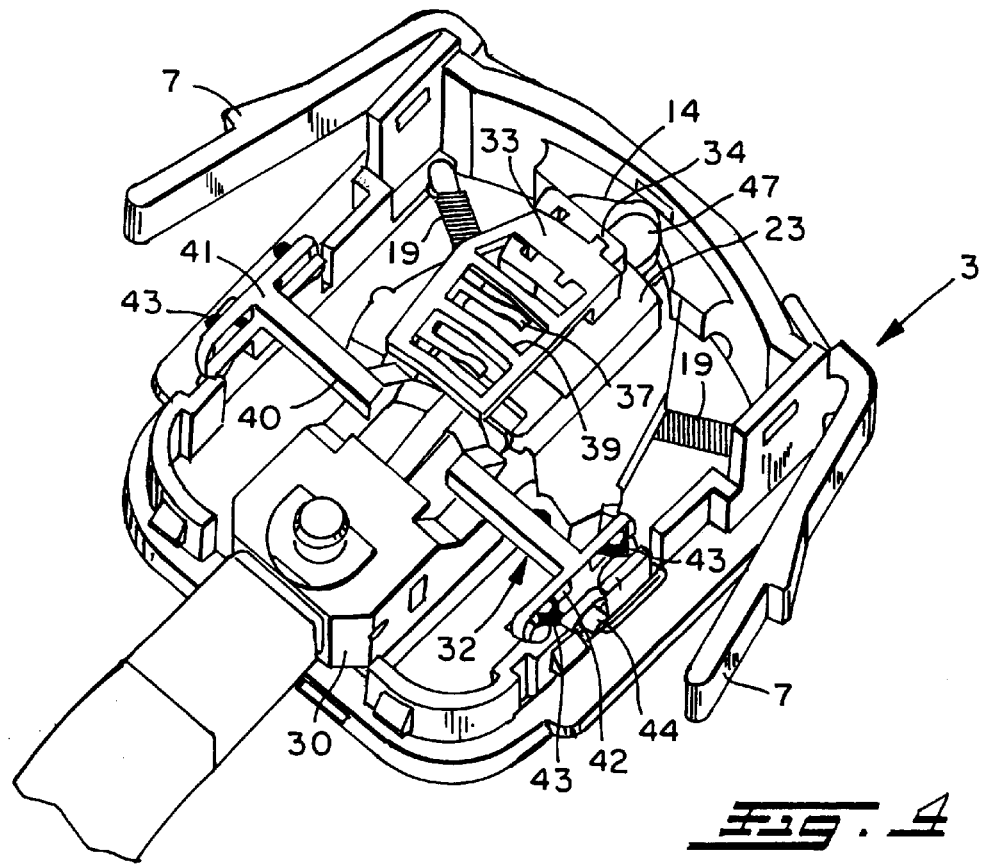
FIG. 4 is a perspective view of the loaded upper housing part of the inventive lever switch.
Figure 5:
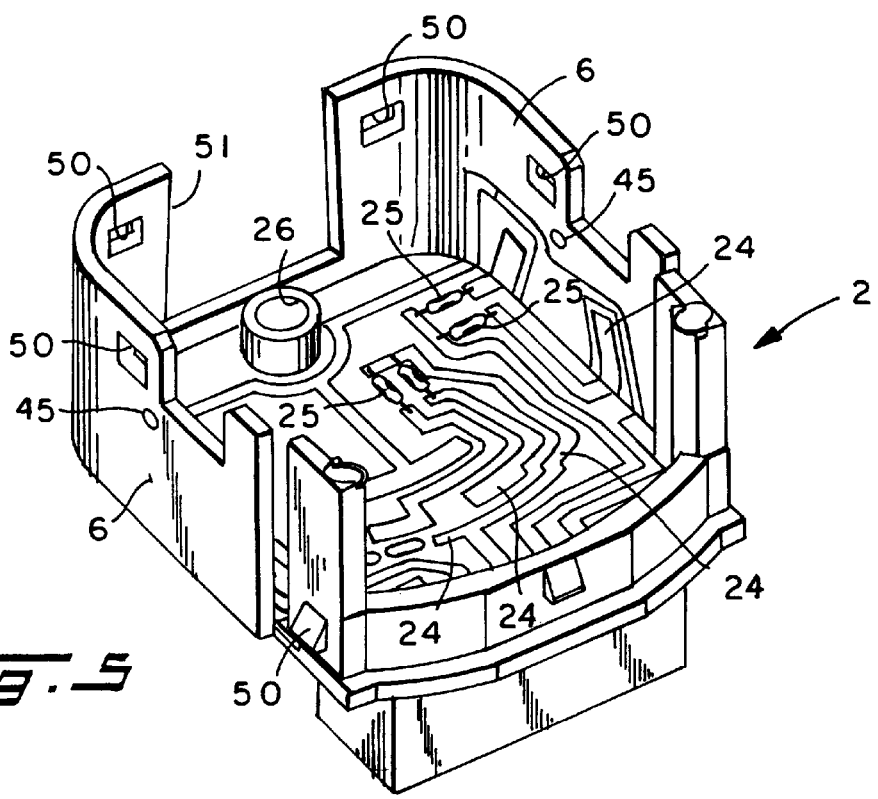
FIG. 5 is a perspective view of the partially loaded lower housing part of the inventive lever switch.

FIG. 4 shows an assembled upper housing part indicated generally at 3 in FIG. 4. Rotary switch element 30 consisting of centerpiece 23 and contact carrier 33, as well as pivot switch element 32, are clearly visible. Contact springs 37 and 43 facing switch contact paths 24 extend through cutouts 39 and 42. Furthermore, guide 34 can be recognized between centerpiece 23 and contact carrier 33. FIG. 5 shows a view of lower housing part indicated generally at 2 in FIG. 5 with interior switch contact paths 24 exposed. Switch contact paths 24 configured as a punch grid are continued in lateral walls 6 of lower housing part 2. Different ends of switch contact paths 24 are connected by means of resistors 25. Axle accommodation part bore 26 projects from the bottom of lower housing part 2. Lateral wall 6 has a cutout 51, through which switch lever 10 can extend. Clip elements 50 used to connect lower housing part 2 with upper housing part 3 are in the form of recesses in lateral walls 6.

Figure 6:
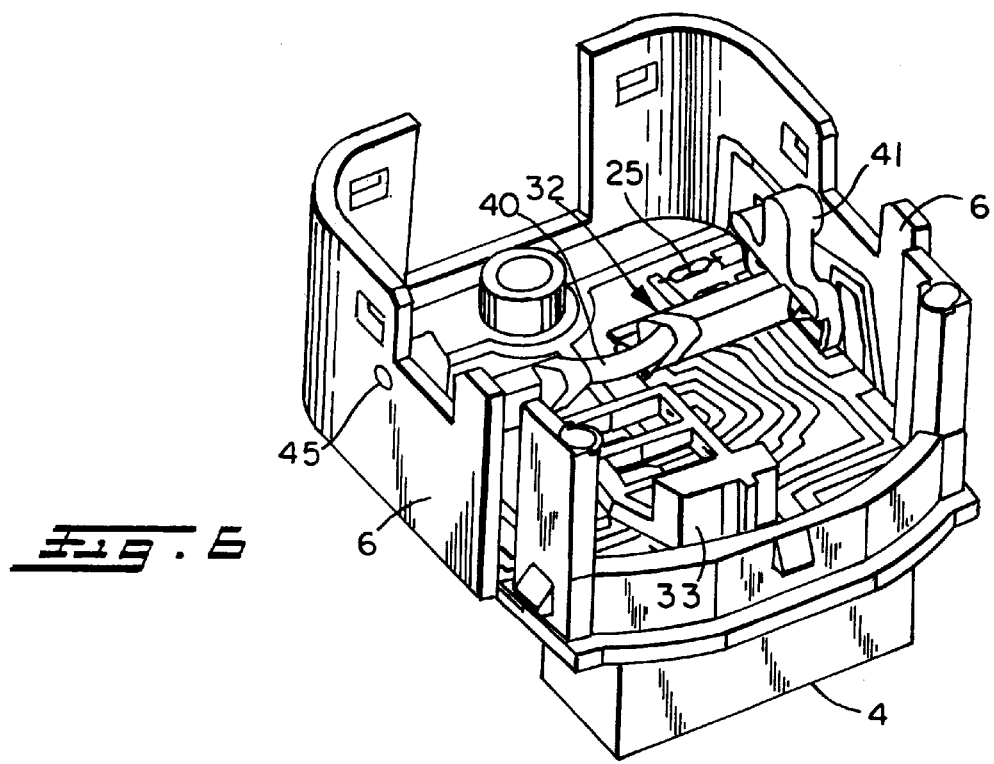
FIG. 6 is a perspective view of the inside of the lower housing part with the installed pivot switch element and with a partial rotary switch element.
Figure 7:
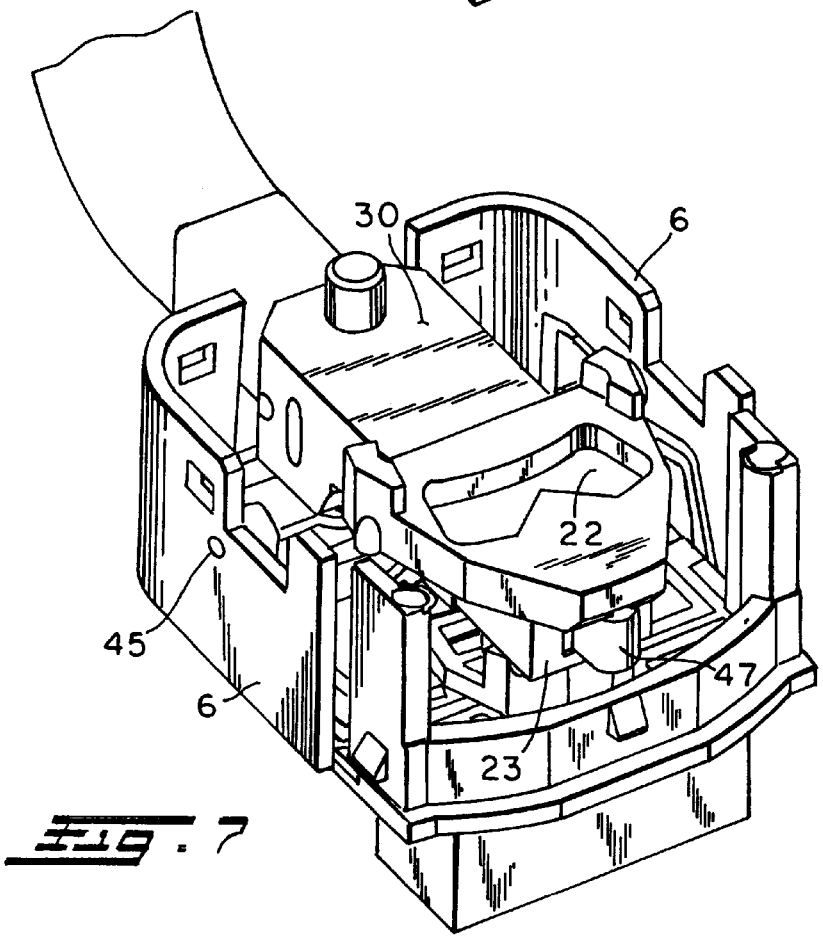
FIG. 7 is a perspective view of the mounted lever switch without the upper housing part and without the resetting mechanism.

FIG. 6 shows another assembled lower housing part 2. Installed next to contact carrier 33 is pivot switch element 32. The pivot pins (not visible) are located in pin holes 45. FIG. 7 shows rotary switch element 30 inserted in lower housing part 2. At the top is triggering gate 22; and rotary stop element 47 projects from the centerpiece 23.

In FIG. 8 resetting mechanism 13 is set on rotary switch element 30, said mechanism comprising triggering element 12 with lugs 31, into which tensions springs 19 are hooked. The other end of each of the tension springs 19 is hooked into one of the hooks 52 provided on lateral walls 6 of lower housing part 2. Furthermore, spring-biased centering piece 17 can be recognized, which piece has a longitudinal hole 58 for engagement of the upper pin 20 of triggering element 12. Lower pin 21 is located in the partially visible triggering gate 22.

FIG. 9 shows a pre-assembled upper housing part 3. As an alternative, it is possible in this case to clip pivot pin 44 of pivot switch element 32 in pin holes 53 in upper housing part 3. Pivot disks 41 are provided with spacer nubs 54, by means of which pivot switch element 32 is centered between lateral walls 6 of lower housing part 2. Furthermore, spacer nubs 54 prevent contact springs 43 from being stressed excessively.

Although the invention has hereinabove been described with respect to the illustrated embodiments, it will be understood that the invention is capable of modification and variation and is limited only by the following claims.

We claim:

1. A lever switch, in particular steering column switch for motor vehicles, comprising a housing with connector contacts and a plurality of switch contact paths, a switch lever pivotally supported in the housing, a switch element, actuated by the switch lever and acting on said switch contact paths, and a switch gate, which functions to reset the switch lever or lock it in position, characterized in that, the layout of the switch contact paths are configured such that different switching functions of the lever switch are implemented by the addition of resistors with respect to the switch contact paths and by interchanging said switch gates.

2. The lever switch in accordance with claim 1, characterized in that the housing consists of an upper housing part and a lower housing part accommodating between them the switch gate and the switch element, whereby the switch element is associated with the switch contact paths.

3. The lever switch in accordance with claim 1, characterized in that at least two switch elements are provided, and a rotary switch element is supported between the upper housing part and the lower housing part and whereby a pivot switch element is held in a rotatable manner perpendicular thereto in the upper housing part.

4. The lever switch in accordance with claim 1, characterized in that the switch contact paths are configured as at least one punch grid provided with contact sites for the installation of said resistors and said connector contacts.

5. The lever switch in accordance with claim 1, characterized in that, the resetting mechanism is omitted and a wiper switch with washer function is implemented with the installation of an appropriate switch gate and appropriate resistors.

6. The lever switch in accordance with claim 1, characterized in that the switch gate in the housing replaced by the use of an interchangeable insert in a tool.

7. A lever actuated switch for use on a vehicle steering column comprising:

(a) a housing having a plurality of stationary contacts therein and connector terminals and conductors connecting said contacts to said connector terminals which are adapted for external electrical circuit connection;

(b) a lever pivotally supported on said housing for user movement;

(c) a switching element actuated by said user movement of said lever, said switching element operative for acting on said stationary contacts for effecting an electrical switching function;

(d) a switch gate operative for acting on said lever in a manner selected from the group consisting of (i) resetting and (ii) locking, wherein said switch gate is separately removable from said housing for interchangeably providing different resetting and locking arrangements; and, (e) wherein the switching function of said switch is changeable by connecting at least one resistor between said conductors and by interchanging said switch gate.

8. The lever switch defined in claim 7, wherein said pivotal support for said lever includes a universal joint.

9. The lever switch defined in claim 7, wherein said conductors are configured on a punch grid having provided thereon sites for installation of said at least thereon.

* * * * *